US009547916B2

(12) United States Patent
Prakash et al.

(10) Patent No.: US 9,547,916 B2
(45) Date of Patent: *Jan. 17, 2017

(54) SEGMENT-BASED ENCODING SYSTEM INCLUDING SEGMENT-SPECIFIC METADATA

(75) Inventors: Adityo Prakash, Redwood Shores, CA (US); Eniko Fodor, Redwood Shores, CA (US)

(73) Assignee: Altera Corporation, San Jose, CA (US)

( * ) Notice: Subject to any disclaimer, the term of this patent is extended or adjusted under 35 U.S.C. 154(b) by 2639 days.

This patent is subject to a terminal disclaimer.

(21) Appl. No.: 11/452,087

(22) Filed: Jun. 12, 2006

(65) Prior Publication Data

US 2006/0256852 A1 Nov. 16, 2006

Related U.S. Application Data

(63) Continuation of application No. 10/338,086, filed on Jan. 6, 2003, now Pat. No. 7,082,162, which is a (Continued)

(51) Int. Cl.
*G06T 9/00* (2006.01)
*H04N 19/52* (2014.01)
(Continued)

(52) U.S. Cl.
CPC ............ *G06T 9/001* (2013.01); *H04N 19/107* (2014.11); *H04N 19/12* (2014.11); *H04N 19/162* (2014.11); *H04N 19/17* (2014.11); *H04N 19/196* (2014.11); *H04N 19/20* (2014.11); *H04N 19/23* (2014.11); *H04N 19/46* (2014.11); *H04N 19/463* (2014.11); *H04N 19/507* (2014.11); *H04N 19/51* (2014.11); *H04N 19/517* (2014.11); *H04N 19/52* (2014.11); *H04N 19/543* (2014.11); (Continued)

(58) Field of Classification Search
CPC ............ H04N 19/0003; H04N 19/0026; H04N 19/00387; H04N 7/50; H04N 7/26941; H04N 21/2365; H04N 21/4347; H04N 7/26244
USPC ............ 375/240.15, 240.14, 240.04, 240.13, 375/240.16; 382/238, 232, 236; 715/201, 169

See application file for complete search history.

(56) References Cited

U.S. PATENT DOCUMENTS 5,285,276 A * 2/1994 Citta .................. 375/240.12
5,485,279 A * 1/1996 Yonemitsu et al. ..... 375/240.14
(Continued)

*Primary Examiner* — Tung Vo
(74) *Attorney, Agent, or Firm* — Okamoto & Benedicto LLP

(57) ABSTRACT

An encoder segments frames of video data and associates metadata with segments. The metadata elements can be associated with the segments that include areas of the frame associated with the metadata elements. A motion matcher can match segments of a reference frame to pixels of a current nonkey frame being encoded when a metadata associator associates elements of metadata with segments of the segmentation of the reference frame and associates a matched segment's metadata elements with matched areas of the current frame. The metadata elements might represent actions to be taken when a user of the video data indicates a selection of an area of an image that has that metadata element associated therewith. The metadata associations can be included in the encoded video data or deduced by a decoder. The metadata associations can be independent of segment indices or other segment changes.

17 Claims, 9 Drawing Sheets

Related U.S. Application Data continuation-in-part of application No. 09/550,705, filed on Apr. 17, 2000, now Pat. No. 6,600,786.

(60) Provisional application No. 60/129,854, filed on Apr. 17, 1999, provisional application No. 60/129,853, filed on Apr. 17, 1999.

(51) Int. Cl.

| | | |
|---|---|---|
| *H04N 19/46* | (2014.01) | |
| *H04N 19/51* | (2014.01) | |
| *H04N 19/196* | (2014.01) | |
| *H04N 19/61* | (2014.01) | |
| *H04N 19/107* | (2014.01) | |
| *H04N 19/12* | (2014.01) | |
| *H04N 19/463* | (2014.01) | |
| *H04N 19/162* | (2014.01) | |
| *H04N 19/17* | (2014.01) | |
| *H04N 19/80* | (2014.01) | |
| *H04N 19/20* | (2014.01) | |
| *H04N 19/23* | (2014.01) | |
| *H04N 19/543* | (2014.01) | |
| *H04N 19/553* | (2014.01) | |
| *H04N 19/517* | (2014.01) | |
| *H04N 19/507* | (2014.01) | |
| *H04N 19/59* | (2014.01) | |

(52) U.S. Cl.
CPC .......... *H04N 19/553* (2014.11); *H04N 19/59* (2014.11); *H04N 19/61* (2014.11); *H04N 19/80* (2014.11)

(56) References Cited

U.S. PATENT DOCUMENTS

| | | | | |
|---|---|---|---|---|
| 5,654,760 | A * | 8/1997 | Ohtsuki | 375/240.04 |
| 5,657,086 | A * | 8/1997 | Tahara et al. | 375/240.13 |
| 5,703,646 | A * | 12/1997 | Oda | 375/240.13 |
| 5,719,986 | A * | 2/1998 | Kato et al. | 386/109 |
| 5,926,572 | A * | 7/1999 | Kim et al. | 382/238 |
| 5,983,251 | A * | 11/1999 | Martens et al. | 708/203 |
| 6,026,182 | A * | 2/2000 | Lee et al. | 382/173 |
| 6,055,330 | A * | 4/2000 | Eleftheriadis et al. | 382/154 |
| 6,057,884 | A * | 5/2000 | Chen et al. | 375/240.16 |
| 6,278,466 | B1 * | 8/2001 | Chen | 345/473 |
| 6,360,234 | B2 * | 3/2002 | Jain et al. | 715/201 |
| 6,567,980 | B1 * | 5/2003 | Jain et al. | 725/61 |
| 6,694,416 | B1 * | 2/2004 | Thomann et al. | 711/169 |
| 6,735,253 | B1 * | 5/2004 | Chang et al. | 375/240.16 |

* cited by examiner

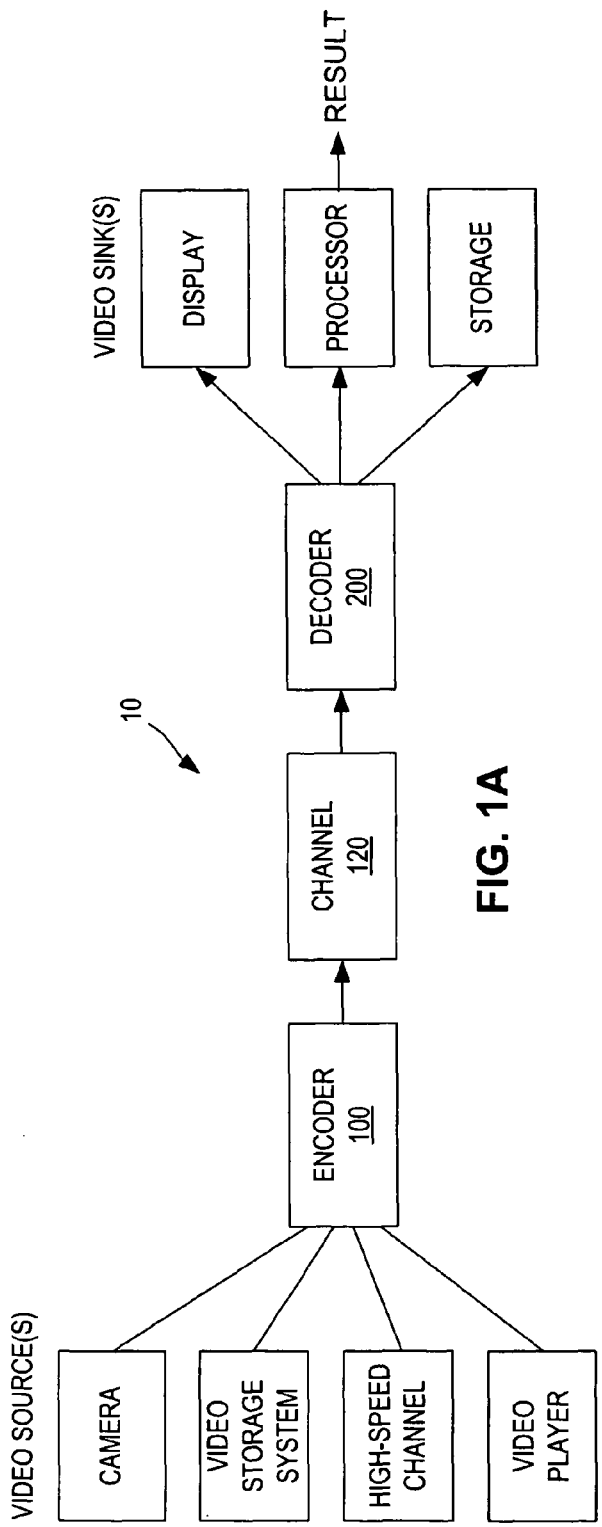
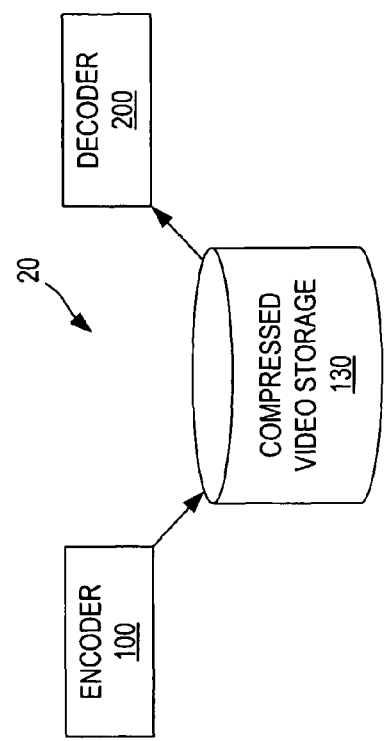

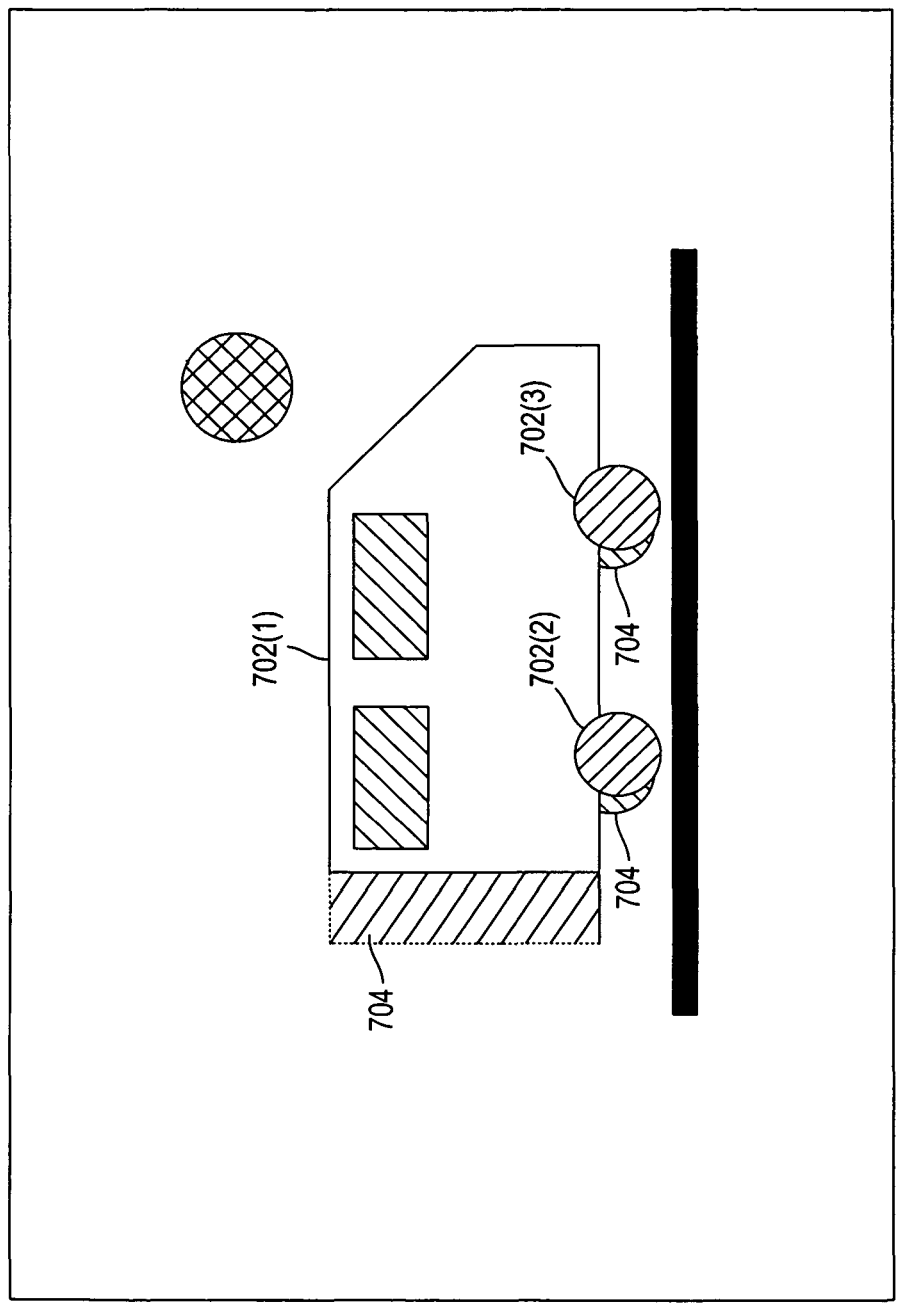

SEGMENT-BASED ENCODING SYSTEM INCLUDING SEGMENT-SPECIFIC METADATA

CROSS-REFERENCES TO RELATED APPLICATIONS

The present application is a continuation of U.S. application Ser. No. 10/338,086, entitled "Segment-Based Encoding System Including Segment-Specific Metadata," filed on Jan. 6, 2003 with named inventors Adityo Prakash and Eniko Fodor. U.S. application Ser. No. 10/338,086 is a continuation-in-part of U.S. application Ser. No. 09/550,705, filed on Apr. 17, 2000, which is a non-provisional of and claims the benefit of U.S. Application No. 60/129,854, filed on Apr. 17, 1999 and U.S. Application No. 60/129,853, filed on Apr. 17, 1999. The complete disclosures of the aforementioned applications are hereby incorporated by reference.

FIELD OF THE INVENTION

The present invention relates generally to the compression of video data, and more particularly to a synchronized encoder/decoder system wherein the decoder performs a segmentation that is performed by the encoder for encoding video data so that the encoder need not convey to the decoder the entire results of the encoder's segmentation.

BACKGROUND OF THE INVENTION

1. Brief Introduction

As more communication requires video, such as real-time streaming of video, video conferencing, digital television, interactive television and Internet-based communications such as hypertext transport of World Wide Web (WWW) content, more efficient ways of utilizing existing bandwidth are needed. This is because the typical bandwidth allocated to a particular transmission mode (e.g., broadcast, cable, telephone lines, etc.) is much less than the bandwidth typically required for a video stream. Thus, if such modes are to carry video, compression is needed. Compression is also needed where the video is stored, so that storage capacity is efficiently used. The advent of multi-media capabilities on most computer systems has taxed traditional storage devices, such as hard drives, to their limits.

Compression allows digitized video sequences to be represented efficiently, allowing more video to be transmitted in a given amount of time over a given channel, or more video to be stored in a given storage medium. Compression does this by reducing the bitstream, or video information flow, of the video sequences at a transmitter (which can be placing the bitstream into a channel or storing into a storage medium) while retaining enough information that a decoder or receiver at the other end of the channel or reading the storage medium can reconstruct the video in a manner adequate for the specific application, such as television, videoconferencing, etc.

Video is typically represented by a sequence of images, called "frames" or "video frames" that, when played in sequence, present the video. As used herein, a video stream might refer to a video and audio stream, where the audio is included with the video. However, for simplicity, just the video compression is often described.

As the terms are used herein, an image is data derived from a multi-dimensional signal. The signal might be originated or generated either naturally or artificially. This multi-dimensional signal (where the dimension could be one, two, three, or more) may be represented as an array of pixel color values such that pixels placed in an array and colored according to each pixel's color value would represent the image. Each pixel has a location and can be thought of as being a point at that location or as a shape that fills the area around the pixel such that any point within the image is considered to be "in" a pixel's area or considered to be part of the pixel. The image itself might be a multidimensional pixel array on a display, on a printed page, an array stored in memory, or a data signal being transmitted and representing the image. The multidimensional pixel array can be a two-dimensional array for a two-dimensional image, a three-dimensional array for a three-dimensional image, or some other number of dimensions.

The image can be an image of a physical space or plane or an image of a simulated and/or computer-generated space or plane. In the computer graphic arts, a common image is a two-dimensional view of a computer-generated three-dimensional space (such as a geometric model of objects and light sources in a three-space). An image can be a single image or one of a plurality of images that, when arranged in a suitable time order, form a moving image, herein referred to as a video sequence.

Pixel color values can be selected from any number of pixel color spaces. One color space in common use is known as the YUV color space, wherein a pixel color value is described by the triple (Y, U, V), where the Y component refers to a grayscale intensity or luminance, and U and V refer to two chrominance components. The YUV color space is commonly seen in television applications. Another common color space is referred to as the RGB color space, wherein R, G and B refer to the Red, Green and Blue color components, respectively. The RGB color space is commonly seen in computer graphics representations, along with CYMB (cyan, yellow, magenta, and black) often used with computer printers.

Video compression is possible because an uncompressed video sequence contains redundancies and some of the video signal can be discarded without greatly affecting the resulting video. For example, each frame of a video sequence representing a stationary scene would be nearly identical to other frames in the video sequence. Most video compression routines attempt to remove the superfluous information so that the related image frames can be represented in terms of previous image frame(s), thus eliminating the need to transmit an entire image for each video frame. Alternatively, routines like motion JPEG, code each video frame separately and ignore temporal redundancy.

2. Known Compression Techniques

There have been numerous attempts at adequately compressing video imagery. These methods generally fall into the following two categories: 1) spatial redundancy reduction, and 2) temporal redundancy reduction.

2.1. Spatial Redundancy Reduction

Spatial redundancy reduction takes advantage of the correlation among neighboring pixels in order to derive a more efficient representation of the important information in an image frame. These methods are more appropriately termed still-image compression routines, as they generally address each frame in isolation, i.e., independent of other frames in the sequence. Because of this, they do not attempt to temporal, or frame-to-frame, redundancy. Common still-image compression schemes include JPEG, wavelets, and fractals.

2.1.1. JPEG/DCT Based Image Compression

One of the first commonly used methods of still-image compression was the direct cosine transformation ("DCT") compression system, which is at the heart of JPEG. DCT operates by representing each digital image frame as a series of cosine waves or frequencies and quantizing coefficients of the cosine series. The higher frequency coefficients are quantized more harshly than those of the lower frequencies. The result of the quantization is a large number of zero coefficients, which can be encoded very efficiently. However, JPEG and similar compression schemes do not address the crucial issue of temporal redundancy.

2.1.2. Wavelets

As a slight improvement to the DCT compression scheme, the wavelet transformation compression scheme was devised. This system is similar to the DCT, differing mainly in that an image frame is represented as a series of wavelets, or windowed oscillations, instead of as a series of cosine waves.

2.1.3. Fractals

Another technique is known as fractal compression. The goal of fractal compression is to take an image and determine a single function, or a set of functions, which fully describe(s) the image frame. A fractal is an object that is self-similar at different scales or resolutions, i.e., no matter what resolution one looks at, the object remains the same. In theory, where fractals allow simple equations to describe complex images, very high compression ratios should be achievable.

Unfortunately, fractal compression is not a viable method of general compression. The high compression ratios are only achievable for specially constructed images, and only with considerable help from a person guiding the compression process. In addition, fractal compression is very computationally intensive.

2.2. Temporal and Spatial Redundancy Reduction

Adequate motion video compression requires reduction of both temporal and spatial redundancies. Temporal redundancy can be reduced by replacing all or part of the bits representing the image of a frame with one or more references to other frames or portions of a frame. This allows a small number of bits to represent a larger number of bits. Block matching is the basis for most currently used effective means of temporal redundancy removal.

In block matching, an image frame is subdivided into uniform size blocks (more generally, into polygons), and each block is tracked from one frame to another and represented by a motion vector, instead of having the block re-coded and placed into the bitstream for a second time. Examples of compression routines that use block matching include MPEG and variants thereof.

MPEG encodes the first frame in a sequence of related frames in its entirety as a so-called intra-frame, or I-frame. An I-frame is a type of key frame, meaning an image frame that is completely self-contained and not described in relation to any other image frame. To create an I-frame, MPEG performs a still-image compression on the frame, including dividing the frame into 16 pixel by 16 pixel square blocks. Other (so-called "predicted") frames are encoded with respect to the I-frame by predicting corresponding blocks of the other frame in relation to that of the I-frame. That is, MPEG attempts to find each block of an I-frame within the other frame. For each block that still exists in the other frame, MPEG transmits the motion vector, or movement, of the block along with block identifying information. However, as a block moves from frame to frame, it may change slightly. The difference relative to the I-frame is known as residue. Additionally, as blocks move, previously hidden areas may become visible for the first time. These previously hidden areas are also known as residue. That is, the collective remaining information after the block motion is sent is known as the residue, which is coded using JPEG and included in the bitstream to complete the image frame.

Subsequent frames are predicted with respect to either the blocks of the I-frame or a preceding predicted frame. In addition, the prediction can be bi-directional, i.e., with reference to both preceding and subsequent I-frames or predicted frames. The prediction process continues until a new key frame is inserted, at which point a new I-frame is encoded and the process repeats itself.

Although state of the art, block matching is highly inefficient and fails to take advantage of the known general physical characteristics or other information inherent in the images. The block method is both arbitrary and crude, as the blocks do not have any relationship with real objects in the image. A given block may comprise a part of an object, a whole object, or even multiple dissimilar objects with unrelated motion. In addition, neighboring objects will often have similar motion. However, since blocks do not correspond to real objects, block-based systems cannot use this information to further reduce the bitstream.

Yet another major limitation of block-based matches arises because the residue created by block-based matching is generally noisy and patchy. Thus, block-based residues do not lend themselves to good compression via standard image compression schemes such as DCT, wavelets, or fractals.

2.3. Alternatives

It is well recognized that the state of the art needs improvement, specifically in that the block-based method is extremely inefficient and does not produce an optimally compressed bitstream for motion video information. To that end, the very latest compression schemes, such as MPEG4, allow for the inclusion of limited structural information, if available, of selected items within the frames rather than merely using arbitrary-sized blocks. While some compression gains are achieved, the associated overhead information is substantially increased because, in addition to the motion and residue information, these schemes require that structural or shape information for each object in a frame must also be sent to the receiver.

Additionally, as mentioned above, the current compression methods treat the residue as just another image frame to be compressed by JPEG using a fixed compression.

BRIEF SUMMARY OF THE INVENTION

An encoding system includes an encoder that segments frames of video data and associates metadata with segments. Where metadata elements are associated with areas of the frame, the metadata elements can be associated with the segments that include those areas of the frame. Where nonkey frames are encoded, a motion matcher matches segments of a reference frame to pixels of a current frame being encoded when the current frame is a nonkey frame and a metadata associator creates a metadata element associated with the segment of the reference frame and further associated with the matched area of the current frame.

In some embodiments, the metadata associator receives indications of areas of the reference frame to which metadata elements are associated and associates the metadata elements to the segments that include the indicated areas of the reference frame. The metadata elements might specify a response to an input indicating a selection of the area of a current frame associated with the metadata element. In a further embodiment, the metadata element includes a Uniform Resource Locator associating data with the area of a current frame associated with the metadata element. The metadata associations can be included in the video data provided to a decoder, or the metadata associations can be deduced by the decoder from previously decoded information and the decoder determines the associations using a process that matches, at least approximately, a process performed by the metadata associator of the encoder. The metadata associations can be independent of segment indices, such that metadata is inheritable by a segment from a first frame to a second frame even if the segment's index changes. The metadata associations can be independent of segment changes, such that metadata is inheritable by a plurality of segment in a second frame from a single segment in a first frame if the plurality of segment and single segments are matched.

BRIEF DESCRIPTION OF THE DRAWINGS

FIG. 1 is a block diagram of a video stream processing system; FIG. 1(a) illustrates an example where video is compressed for transmission over a channel; FIG. 1(b) illustrates an example where video is compressed for storage.

FIG. 7 is an illustration of exposed areas.

DETAILED DESCRIPTION OF THE INVENTION

Figure 2:
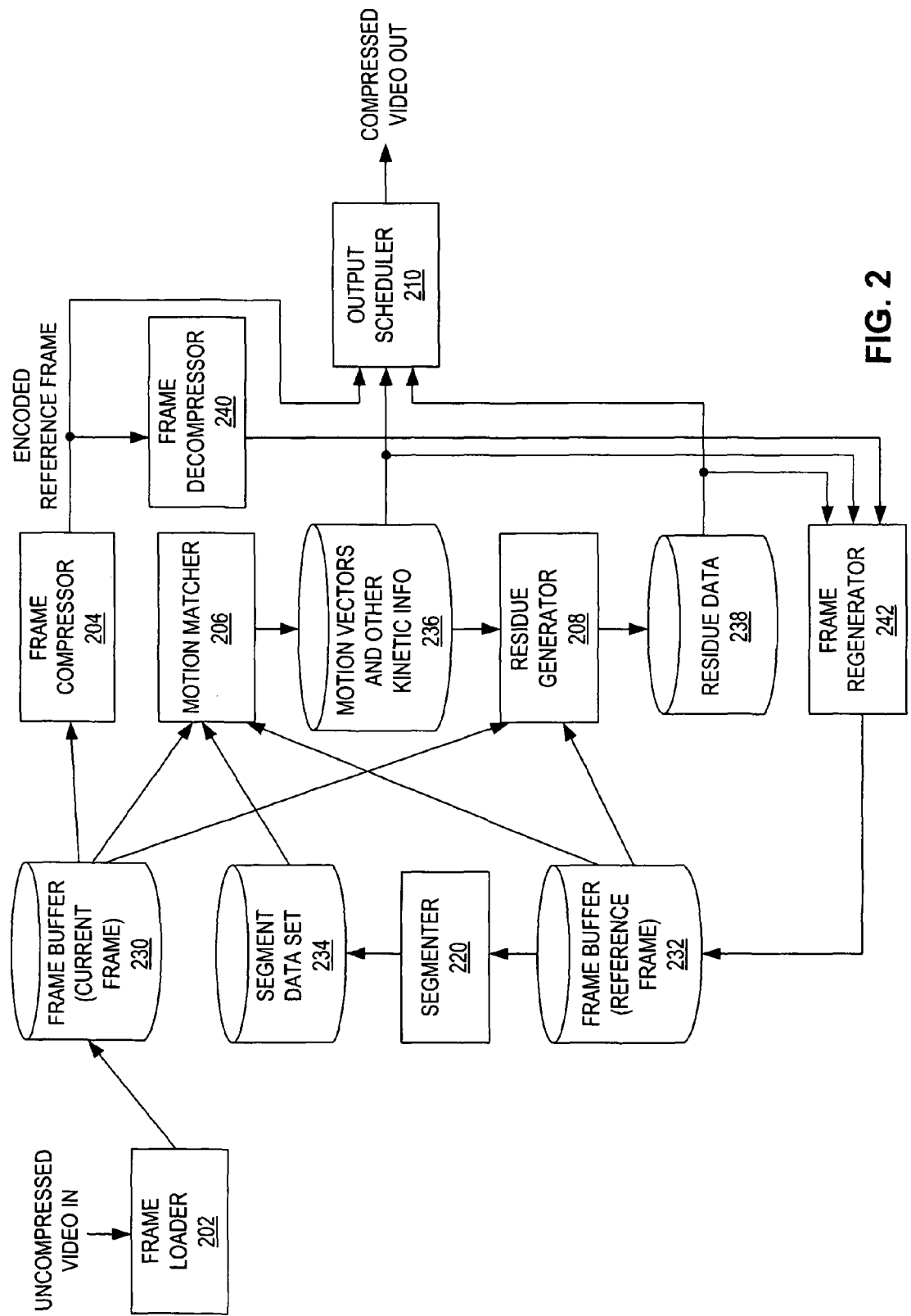
FIG. 2 is a block diagram of an encoder according to embodiments of the present invention.

FIG. 1 is a block diagram of a video stream processing system 10. System 10 accepts video data from any number of sources, encodes it using encoder 100 such that the video data is compressed (i.e., occupies fewer bits than the uncompressed video data) for transport or storage. System 10 includes a decoder 200 that receives the transported or stored compressed video data and decompresses for use by any number of video sinks (users).

Merely by way of example, possible video sources include a video camera, a video storage system (typically storing uncompressed, or partially compressed, video data), a high-speed channel, such as a cable link or broadcast link capable of transmitting uncompressed or partially compressed video data, or a video player, such as a VCR or DVD player. Possible video users, for example, might include a display device, such as a monitor or television, a video processor or video storage that can store decoded video data.

FIG. 1(a) illustrates an example where video is compressed for transmission over a channel 120. Channel 120, for example, could be a digital subscriber line (DSL), a cable modem, a dialup connection, broadcast, cable broadcast, satellite transmission, or the like. In such cases, the video is compressed so that it can be transmitted using available bandwidth efficiently FIG. 1(b) illustrates an example of a system 20 where video is compressed for storage. As shown, encoder 100 encodes video data for storage in compressed video storage 130 for later retrieval by decoder 200. Storage 130 might be, for example, a hard drive, a memory card, a personal video recorder (PVR), RAM, CD, DVD, or any other suitable storage.

Note that the same encoder and decoder can be used for a transmission system as used for a storage system. Of course, the encoders and decoders could be different. The differences could be external, such as changing the output of the encoder to point to a storage device rather than a channel, but the changes could also be internal, such as changing the methods used by the encoder depending on whether or not the encoder's output is time critical. For example, if it is known a priori that the encoded video will not be read from storage right away, the encoder could trade off speed for improved compression.

In a basic operation, video data, usually uncompressed video data, is provided to encoder 100, which encodes the video data to form compressed video data that occupies fewer bits than the uncompressed video data, and preferably much fewer bits, and makes the uncompressed video data available to the decoder (via a channel, storage, or a combination thereof). The decoder in turn decompresses the compressed video data to arrive at an exactor approximate copy of the uncompressed video data provided to the input of the encoder.

FIG. 2 is a block diagram of encoder 100 according to embodiments of the present invention. As shown there, encoder 100 comprises a frame loader 202, a frame compressor 204, a motion matcher 206, a residue generator 208, an output scheduler 210 and a segmenter 220. Also shown are storage for data being processed, such as a frame buffer 230 for holding all or part of a current frame, frame buffer 232 for holding all or part of a reference frame, segment data set storage 234, kinetic information storage 236 for storing motion factors and other kinetic information, and residue data storage 238. Also shown, and explained below are a frame decompressor 240 and a frame regenerator 242.

Frame loader 202 is configured to receive uncompressed video in and provide the uncompressed video in a frame-by-frame manner to frame buffer 230. It should be understood that the video in could be partially compressed and could be in any of the variety of formats. As shown, frame buffer 230 is coupled to frame processor 204, motion matcher 206, and residue generator 208 to provide all or part of the information embodied in the current frame stored in frame buffer 230.

As used herein, the term "current frame" refers to a frame of video being processed by the encoder. In a typical operation, a frame is loaded into frame buffer 230 and becomes the current frame, that current frame is processed and another frame is loaded into frame buffer 230 and that frame would then be the current frame. The other frame buffer, frame buffer 232, is coupled to motion matcher 206 and residue generator 208 to provide all of part of the information content of the reference frame. Frame buffer 232 is also coupled to a segmenter 220, which is in term coupled to storage 234, thereby allowing segmenter 220 to generate and store a segment data set associated with the reference frame. Storage 234 is coupled to motion matcher 206 to allow motion matcher 206 to obtain all or part of a segment data set.

Residue generator 208 is coupled to frame buffers 230 and 232, as well as kinetic information storage 236 such that residue generator 208 can use information stored therein to generate residue data stored in residue storage 238.

As used herein, the term "reference frame" refers to a frame whose information content is used, at least in part, in the encoding of the current frame. In the general case, the current frame might be encoded with reference to more than one reference frame, but for clarity encoder 100 in its operation is described here where only one reference frame is needed. As used herein, the term "key frame" refers to a frame that is encoded such that it can be decoded without reference to other frames. Note that reference frames are not required to be key frames but can be frames that are encoded with reference to yet other reference frames.

An operation of encoding frames will now be described beginning with the encoder in an initial state. Initially, frame buffer 230 and frame buffer 232 are empty. Frame loader 202 loads frame buffer 230 with a frame of the input video. Since there is no reference frame at this point, that frame in frame buffer 230 would naturally be encoded as a key frame. However, it should be understood, that in some variations, a reference frame might be preloaded, in which case the first frame processed does not need to be the key frame.

Continuing the description of the operation, frame compressor 204 obtains the frame from frame buffer 230 and compresses it into an encoded frame. Such a compression could be lossy or lossless (which, technically, is just a special case of lossy compression). That encoded frame is then provided to output scheduler 210 to form the output video sequence. The encoded frame is also provided to a frame decompressor 240 that decompresses the frame and provides it to frame regenerator 242. The output of frame regenerator 242 is stored in frame buffer 232 as the reference frame to be used for subsequent encoding steps. Of course, if the output of frame compressor 204 is known to be a lossless compression, such that the outputted frame decompressor 240 can be an exact replica of the current frame, then frame decompressor and frame regenerator 242 can be eliminated and instead the contents of frame 230 could simply be copied into frame buffer 232 once the current frame is encoded. Either way, once the current frame has been processed, frame loader 202 can load another frame into frame buffer 230 and that frame would become the current frame to be encoded. At this point, a reference frame is available in frame buffer 232 and a process of encoding the current frame while taking reference to the reference frame will now be described.

Where the current frame is encoded with reference to the reference frame, the use of frame compressor 204 is not required. Instead, motion matcher 206 can operate on the current frame, the reference frame, and segment data about the reference frame generated by segmenter 220, to output from motion matcher 206 kinetic information, which are stored in kinetic information storage 236. The operation of motion matcher 206 is described in more detail below. The kinetic information output by motion matcher 206 relates to changes in segments from the reference frame to the current frame. In other words, the reference frame is segmented such that areas of the reference frame are associated with segment identifiers, thus resulting in segments having segment boundaries bounding pixels of the reference frame. These segments can be matched to pixels in the current frame and kinetic information about the segments can be identified. Merely one example of information about a segment might be a determination that a particular segment of the reference frame is suitably represented by a similar collection of pixels in the current frame, possibly offset in location and/or color values. Once as many segments to be matched are matched from the reference frame to pixels in the current frame, the kinetic information associated with the current frame can be provided to output scheduler 210 to form part or all of the encoding of the current frame, as well as being provided to residue generator 208.

Residue generator 208 can then, from the kinetic information, the current frame, and the reference frame, determine what differences would remain between the current frame and the reference frame after the kinetic information is applied to the segments of the reference frame. Such a residue might include changes in position, shape, or color value of pixels associated with a segment that are not already accounted for in the kinetic information. Residue might also include exposed area. An exposed area would occur, for example, where the segments represent objects in a scene and those objects are moving between the reference frame and the current frame. If that were the case, there would be some pixels in the current frame that are not associated with any segment of the reference frame because the objects or portions of objects represented by those pixels of the current frame were objects or portions of objects obscured by other objects in the reference frame. This is illustrated by FIG. 7, which shows exposed areas 704 resulting from the frame-to-frame motion of segments 702. Thus, the pixel values for exposed areas, and other residues might form the residue data output from residue generator 208 to storage 238.

Residue data 238 is provided to output scheduler 210 to form another part of the encoding of the current frame. As should be apparent from this description, if the residue data is an exact representation of the difference between the reference frame and the current frame after the kinetic information is applied to the reference frame, then the output of output scheduler 210 contains enough information such that the current frame could be exactly reconstructed from nothing more than prior knowledge of the exact contents of the reference frame, the kinetic information relating the reference frame and the current frame and the resulting residue data. However, in some cases exact replication of the current frame is not always required, in which case residue data 238 might be not the exact difference. If that is the case, then frame regenerator 242 is preferably used to regenerate the current frame from the reference frame, the kinetic information, and the residue data, so that the reference frame used for subsequent encoding is not the exact reference frame, but the reference frame as it is known to be recoverable at the decoder.

Encoder 100 can repeat a process with subsequent frames becoming the current frame, until the video is completely encoded. Although an encoder might always have a reference frame available, the encoder could choose to ignore the reference frame and encode the current frame as a key frame. This might happen, for example, as the result of an external trigger, upon detection of a scene change, or after the encoder has determined that the residue data is such that encoding the current frame with the key frame would be more efficient. In instances where frames are not always losslessly compressed, the encoder might decide not to use the reference frame if it determines that sufficient losses have accumulated in the process of encoding frames and using those frames as references for subsequent encodings of frames that are used for references, etc.

Figure 3:
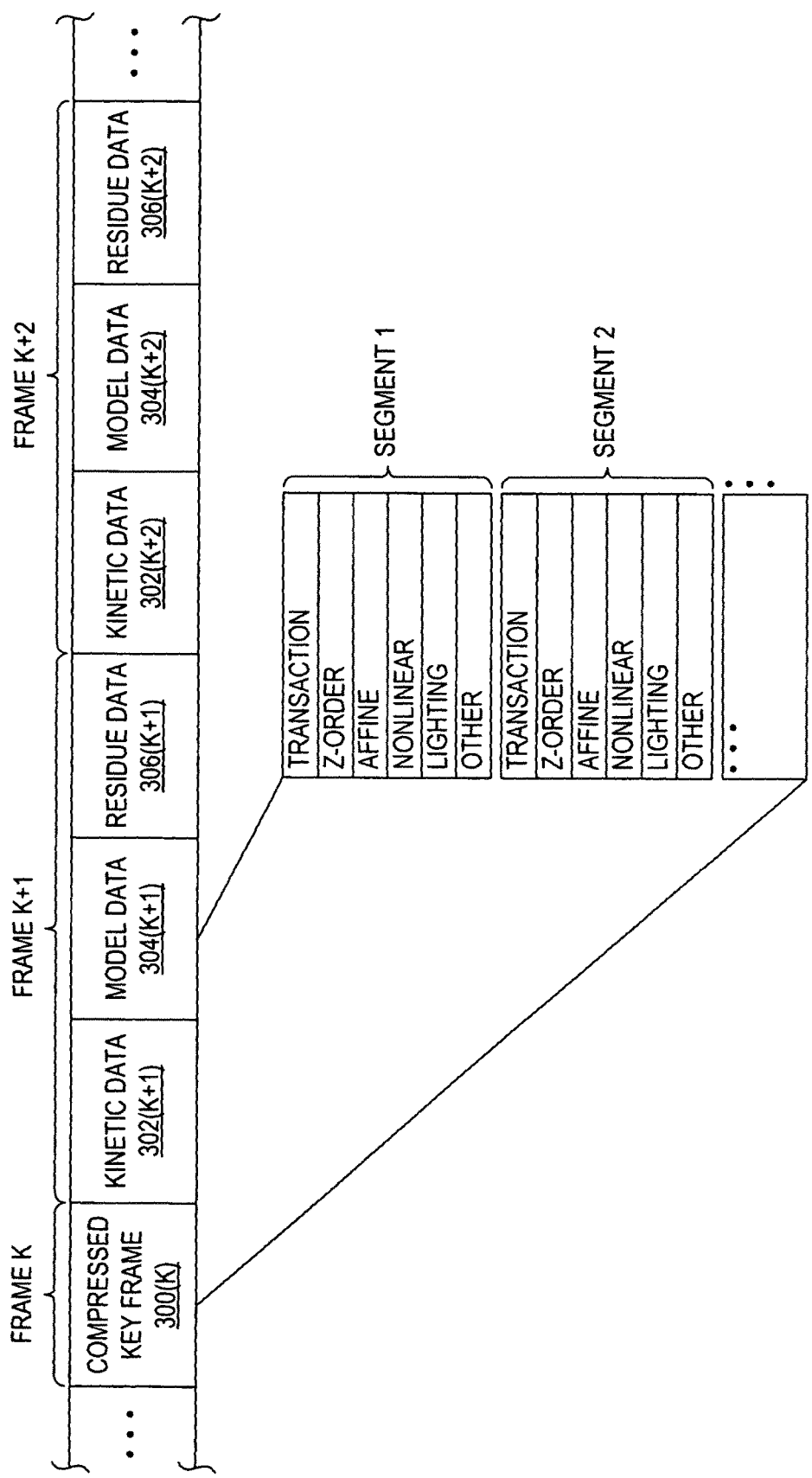
FIG. 3 is a diagram illustrating structure of a video stream according to embodiments of the present invention.

FIG. 3 is a diagram illustrating the structure of a compressed video stream, as might be output by the encoder shown in FIG. 2. As illustrated there, a frame K, followed by several non-key frames, such as frame K+1 and K+2. As illustrated, frames K+1 and K+2 can be fully represented by kinetic data, model data (explained in further detail below with reference to FIG. 6) and residue data. The kinetic data is shown, by way of example, is further detailed as comprising data elements associated with segments of the current frame's reference frame. In this example, the reference frame for frame K+1 might be frame K.

As an example of the kinetic information associated with each segment, the data elements there shown include translation data, z-order data, affine data, non-linear data, lighting data, and other data. The encoded video data stream might also include, either in a header applicable to all frames, or on a frame-by-frame basis, an indication of which of a plurality of segmentations schemes was used, partial segmentation information or segmentation hints and/or partial canonical information about how the segments are ordered or labelled with index values. Typically, canonical information is not needed in the compressed video as the decoder should normally be able to order segments in the same way as the encoder did. The encoded video data stream might have some of the kinetic information associated with segments in a segmentation omitted if it can be predicted by the decoder.

The encoding of difference between rough frame and raw frame can be a novel residue frame as described herein or just a simple difference frame conventionally compressed. The residue frame can be encoded as a frame or might be encoded as segment-by-segment residue.

Figure 4:
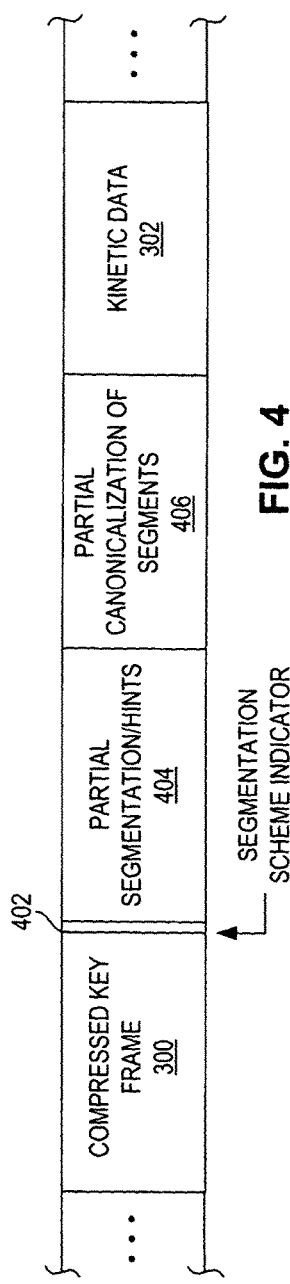
FIG. 4 is a diagram illustrating another variation of structure of a video stream.

FIG. 4 illustrates additional data constructs that might be present in the compressed video information. The additional information shown there includes a field for indicating the segmentation scheme used for the current frame, partial segmentation information and/or hints about segmentation usable by a decoder, canonicalization information indicating an ordering of the segments and other hints that might possibly be present.

One canonicalization approach is to assign segment indices to segments based on position in the frame. For example, the segment that includes the pixel in the upper left corner of the frame could be segment 1, the segment containing the next leftmost pixel in the top row that does not belong to segment 1 could be segment 2, and so on through all the rows of pixels. If this approach is used, the encoder and decoder can independently determine the same canonicalization as they segment their own copies of a reference frame.

Figure 5:
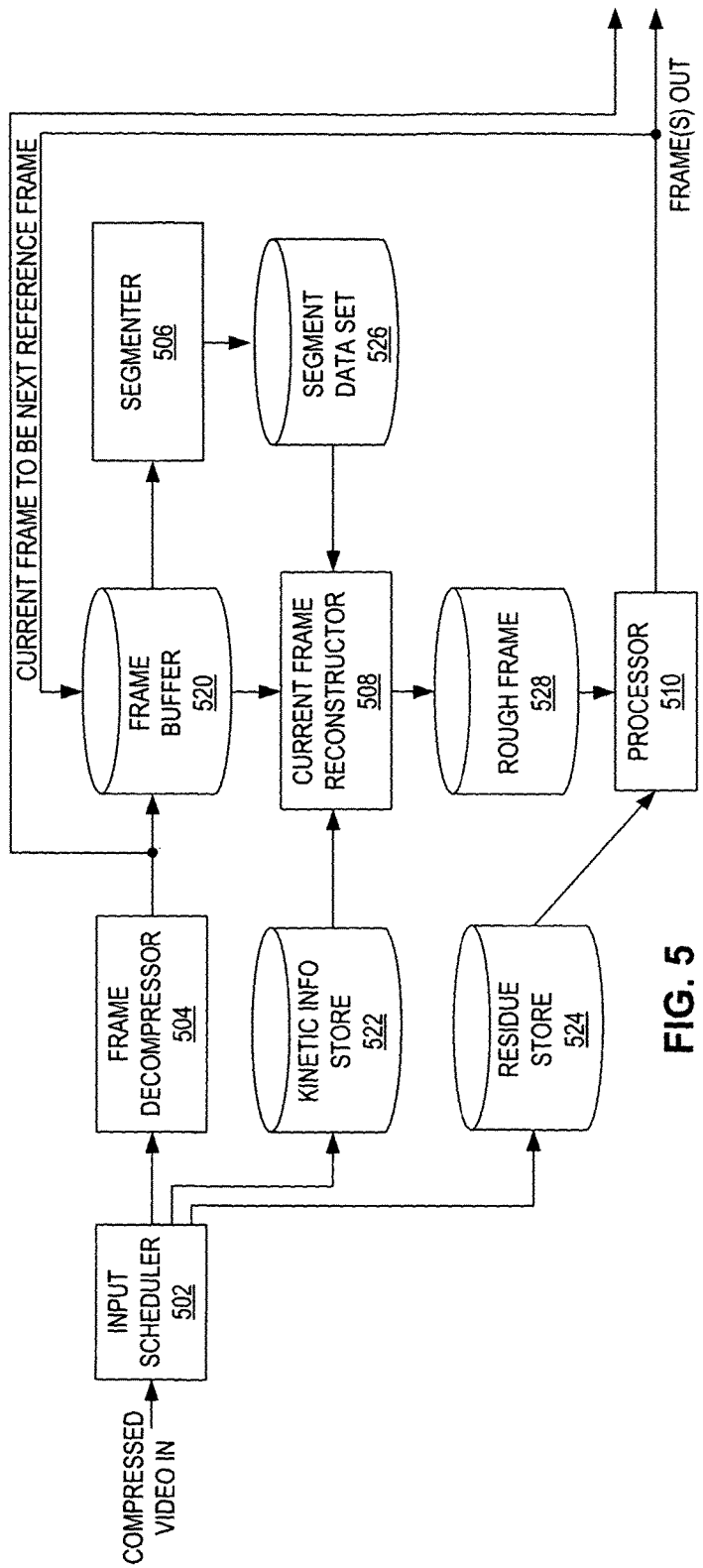
FIG. 5 is a block diagram of a decoder according to embodiments of the present invention.

FIG. 5 is a block diagram of a decoder according to embodiments of the present invention. As shown there, a decoder includes an input scheduler 502, a frame decompressor 504, a segmenter 506, a current frame reconstructor 508 and a processor 510. Input scheduler 502 receives compressed video information, from a channel, from storage or from another source. For key frames, the video data can be provided to frame decompressor 504 for decoding. Frame decompressor 504 can then decode the frame and store it in a frame buffer 520. For nonkey frames, the video data can be provided to kinetic information storage 522 and residue storage 524. Other storage shown includes segment dataset storage 526 and approximation frame storage 528.

In operation, when a key frame is received, input scheduler 502 provides it to frame decompressor 504, which decompresses the key frame, stores it in frame buffer 320 and that uncompressed frame can be output, for the use of the video user coupled to the decoder. When a nonkey frame is received, other elements of the decoder process the frame. In some embodiments, the decoder might determine that the next frame is a key frame by examining a flag in the compressed video data associated with the frame.

Once a frame is decoded and output, it can be the reference frame, stored in frame buffer 520. The decoder includes a segmenter 506 that can segment the frame in frame buffer 520 into a set of segments. The segmentation results are stored in as a segment dataset in storage 526. There are many ways to structure the results. One such method is to identify each segment with an index and a segment boundary, which is a closed shape that encloses one or more pixels of the reference frame (although degenerate, zero-pixel segments should not be ruled out). Another method is to associate each pixel in the reference frame with a segment index. However it is stored, it should be noted that the decoder can generate the segment dataset, at least approximately, without requiring any additional data from the encoder, which might increase the size of the compressed video data. Thus, the decoder doing its own segmentation allows for greater compression than if the decoder relied on the encoder's segmentation results.

When a nonkey frame is processed, the reference frame for that nonkey frame is present in frame buffer 520. As explained above, a nonkey frame might have been encoded with reference to more than one reference frame, but for clarity, this explanation relates to the case where only one reference frame is needed for decoding a nonkey frame. It should be noted that the reference frame need not be the frame immediately prior to the nonkey frame in the video sequence and need not even be prior to the nonkey frame being decoded.

As illustrated in FIG. 3, a nonkey frame is encoded by kinetic data, residue data and possibly other data. In the decoder shown in FIG. 5, the kinetic data for the nonkey frame is supplied to kinetic data storage 522 and the residue data for the nonkey frame is supplied to residue storage 524. The current frame reconstructor is coupled to receive all or part of the reference frame information from frame buffer 520, all or part of the segment dataset for that reference frame, and all or part of the kinetic information for the current frame. The current frame reconstructor is configured to generate a rough frame, stored in storage 528, from that information.

The rough frame is an approximation, although it might be exact, of the current frame from the reference frame, its segmentation and kinetic information relating the segments of the reference frame to the current frame. Note that the segmentation information was not required to be included in the overhead of the compressed video, but instead could have been generated entirely by the decoder. In some embodiments, decoder effort might be more of a concern than efficient bandwidth usage, in which case the encoder might include in the compressed video some partial segmentation information or hints to assist the decoder in generating its own segment dataset.

Processor 510 is configured to accept the rough frame and residue information to form a regenerated current frame, which can then be output by the decoder. The regenerated current frame might then be used as a reference frame for later received (but not necessarily later in the video sequence) frames.

Each of the components shown in FIG. 5 might be implemented in special purpose hardware, programmable hardware or software. For example, each of components 502, 504, 506, 508 and 510 might be portions of one program operating in an input data stream. Each of the storage elements 520, 522, 524, 526 and 528 might be separate storage areas, or might be separate portions of a common storage or memory. In some cases, where it is more efficient, the frame buffers might change roles rather than having the data from one frame buffer copied to another frame buffer.

Generally, the operations of the components of the decoder perform the inverse of the operation performed by the encoder. For example, where the residue data is simply the a compressed difference frame of the difference between a rough frame and the current frame, processor 510 might simply read the residue data for the current frame, decompress it and add it back to the rough frame to result in a reconstruction of the current frame.

Further compression might be possible by special coding of the kinetic information as well as modelling the rough residue representing the difference between the rough frame described above and the current frame. For example, without further processing, the rough residue might contain data about exposed areas. A frame is an image of a real or generated scene and typically contains objects. In some segmentation schemes, segment boundaries follow boundaries of objects in the scene. If relative motion of an object is present between a current frame and a reference frame, there will likely be a portion of the current frame that represents an object or background that does not correspond to a segment in the reference frame because that object or background was obscured by another object in the reference frame but not in the current frame. That area is referred to herein as an "exposed area." An example of exposed areas is illustrated in FIG. 7.

Figure 6:
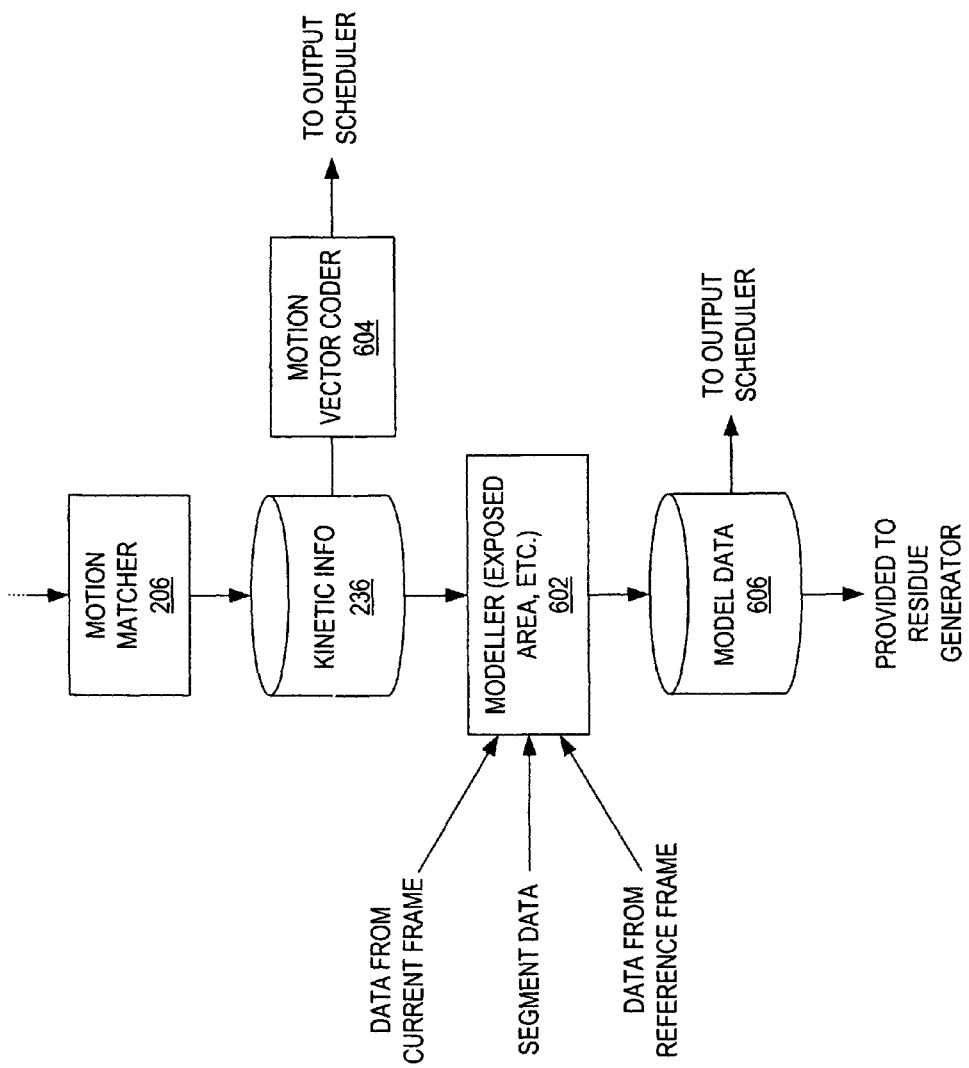
FIG. 6 is a block diagram of a portion of an encoder, such as the encoder of FIG. 2, including a modeller.

FIG. 6 is a block diagram of a portion of a decoder that models the rough residue to form model data and a remaining residue that is hopefully more compressible than the rough residue. As shown in that figure, the kinetic information is provided to a modeller 602 that also has access to the current frame, the reference frame and the segment dataset of the reference frame. Modeller 602 generates model data 606 that is output as part of the compressed data stream (see FIG. 3, for an example of placement) and is provided to a residue generator that would generate the remaining residue.

To further compress the compressed data stream, a motion vector coder 604 codes the motion vectors (and possibly other kinetic information) to reduce redundancy in the motion vectors, prior to the information being included in the output video data.

Figure 8A:
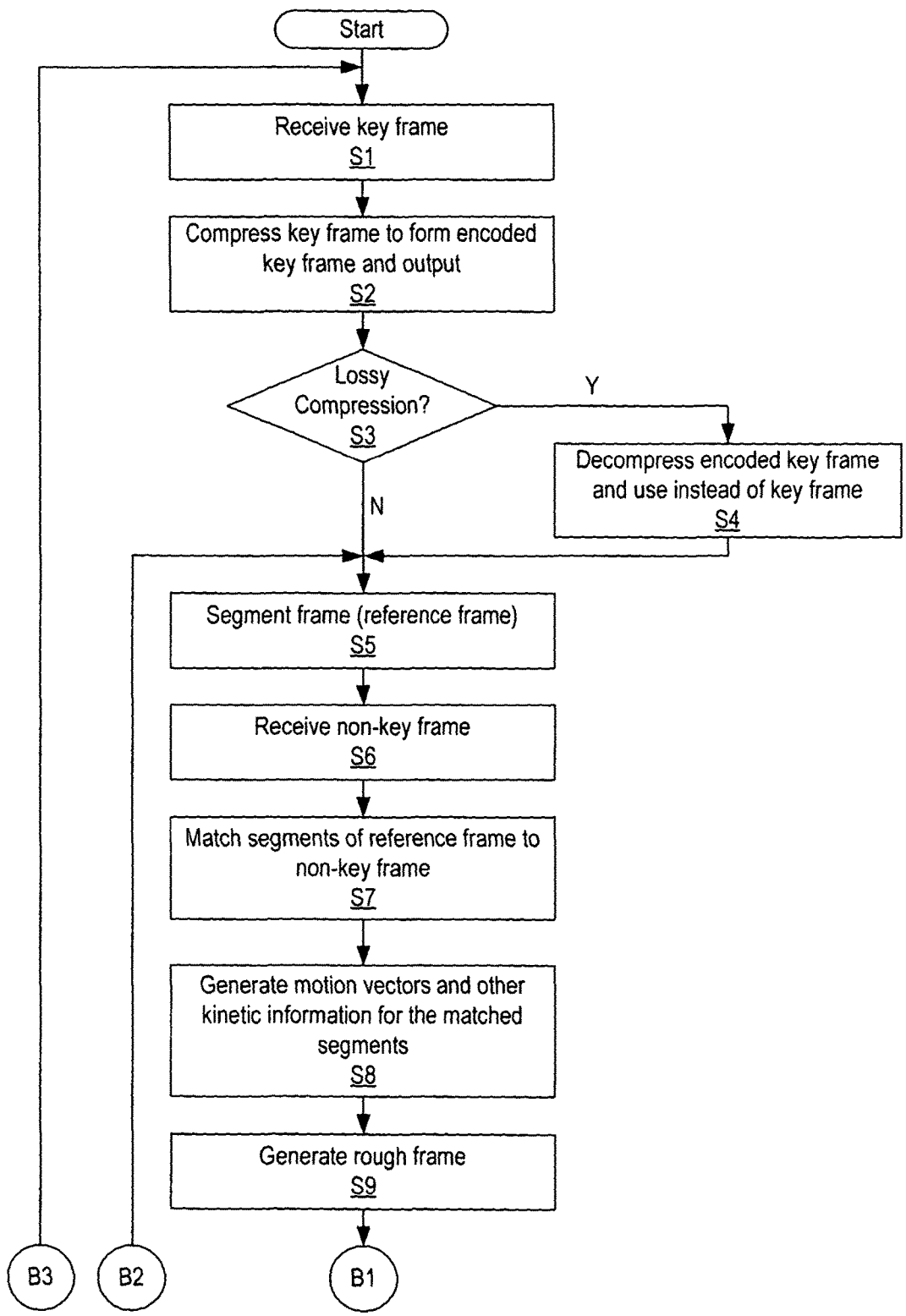
FIG. 8 is a flowchart of an encoding process.
Figure 8B:
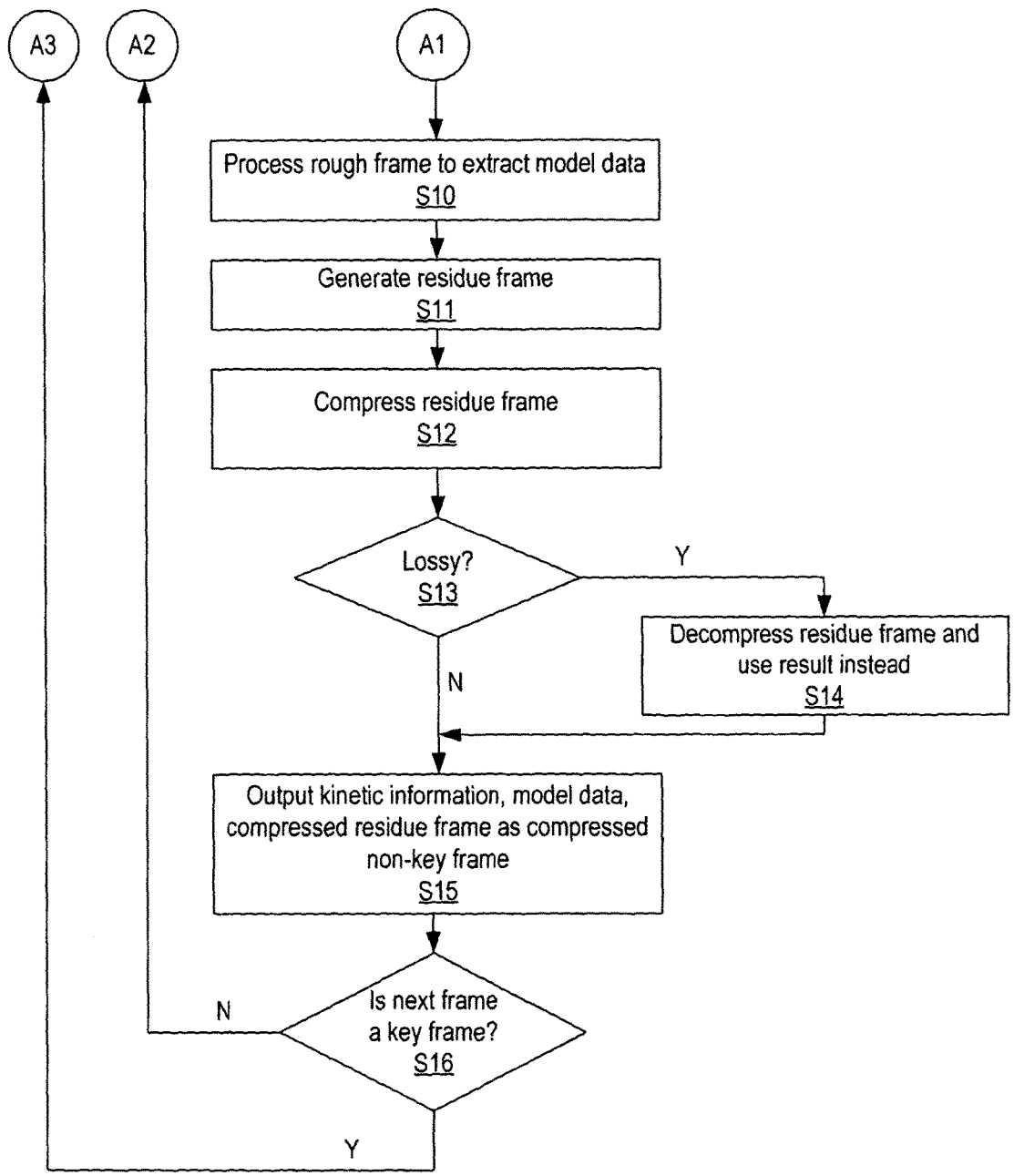

Referring now to FIG. 8, a flowchart of an encoding process is there shown. The process begins with receiving a key frame (step S1) and compressing the key frame to form an encoded key frame that is output as the output of the encoder (S2). The compression can be lossy or lossless (as used herein, lossy compression can include zero loss (lossless) compression). If the compression results in loss of information (S3), the encoded key frame is decompressed to form a reconstructed key frame to be used in subsequent steps in place of the key frame. This allows the decoder to follow along with the encoder's coding process without the encoder having to convey all of its state, because the encoder will operate on what the decoder has, not what the encoder has (although in the lossless case, those will be the same.

At step S5, the frame is now considered a reference frame and a segmentation is generated (S5). Segmentation can be done using known methods. Some approaches to segmentation are shown in U.S. Pat. No. 6,778,698 (U.S. patent application Ser. No. 09/591,438 filed Jun. 9, 2000 and entitled "Method and Apparatus for Digital Image Segmentation"), which is commonly owned with the present application and is incorporated herein for all purposes. In some cases, an encoder might select among a plurality of segmentation schemes, so the encoder selects a scheme. If the scheme is determinable from information that the encoder knows the decoder has, such as the content of prior processed frames, the encoder need not include an indication of the scheme selection in the output video data. The scheme selected might depend on the image content, as some schemes might work better than others for a given image.

At step S6, the encoder receives a second frame that becomes the current frame. Here we assume that the second frame is not a key frame. If it were, the process would loop back to step S1. If a key frame following a key frame is detected early enough, the segmentation of the first key frame might be omitted if it would not get used as a reference for any nonkey frames. Note that the first frame and second frame need not be consecutive and the first frame need not precede the second frame in a video sequence.

Since we assume that the current frame is a nonkey frame, it is processed as such. First, segments of the reference frame (the key frame described above or a nonkey frame from a prior loop) are matched to the pixels of the current frame (S7) to form a segment mapping. The current frame need not be segmented at this point—the mapping is from segments of the reference frame to pixels of the current frame. The process of motion matching might be performed in one or more methods described in U.S. Pat. No. 6,584,213 (U.S. patent application Ser. No. 09/912,743 filed Jul. 23, 2001 and entitled "Motion Matching Method"), which is commonly owned with the present application and is incorporated herein for all purposes.

Next, kinetic information for the segments of the segmentation is generated (S8). The kinetic information for a segment can be simply a motion vector representing an (X, Y) translation of a segment between the reference frame and the current frame, but might include more information. For example, the kinetic information for a segment might indicate other information about the segment between the reference frame to the raw second frame, where the changes might include an indication of a z-order of the segment (relative or absolute; determinable by examining changes in the segment from frame to frame), deformation (rotation, dilation, other affine transformation or a nonlinear transformation defined by a set of deformation parameters), lighting changes (an additive offset in one, two or three color planes, such as an additive offset in a luminance plane and/or a multiplicative offset in one, two or three color planes), and/or residue by segment, or pixel color value offset (linear or nonlinear), such as a color offset for the segment and a multiplicative offset for segment. While z-ordering might be considered an characteristic of a specific image rather than an indication of the changes in a segment from one frame to the next, here "z-ordering" refers to z-ordering as determined by examining the changes of two segments relative to each other from one frame to the next.

Once the kinetic information is generated, a rough frame can be generated (S9). A rough frame is the frame that would result by applying the segments of the reference frame generated in step S5 and the kinetic information generated in step S8 to the reference frame. The rough frame, or the difference between the rough frame and the current frame, can be further processed to determine model data, as might result from exposed area processing and applying non-motion related kinetic information. In some embodiments, the model data is not generated or used.

Whether model data is used or not, the remaining difference between the rough frame and the current frame is generally referred to herein as the residue. A residue frame is generated (S11), if not already available, from the current frame by subtracting out the image portions or pixel values represented by the kinetic data applied to the segments of the reference frame and then subtracting out the image portions or pixel values represented by the model data, if used.

Alternatively, the residue frame could be generated by subtracting the rough frame from the current frame.

This residue frame is compressed (S12), and if the compression is not lossless (S13), the resulting compressed residue frame is decompressed (S14) for use in later steps. If the compression is lossless, the compressed residue frame does not need to be decompressed, as the uncompressed residue frame could be used in the later steps. In some cases, these steps could be omitted regardless of how the compression is done, but preferably the later steps wherein the residue frame is used to generate the reference frame used for later compressions would use the residue frame as it would exist at the decoder, even if that is not exactly what the encoder started with.

Once all of that is done, the encoder can output the compressed current frame as a compressed nonkey frame comprising the set of kinetic information, model data (if used) and a compressed residue frame (S15). Then, the encoder determines whether the next frame will be a key frame (S16). This decision could be made based on some external trigger, a determination that the current frame is from a different scene than the reference frame (scene change detect), or based on the results of compressing the current frame. Although not shown in the figure, the process might include further logic to discard the compressed nonkey frame generated for the current frame if the compression is not good enough and repeat the process with the current frame being treated as a key frame.

If the next frame is a nonkey frame, the current frame is labelled as the reference frame (possibly moved into a frame buffer allocated for the reference frame). Where the compression is not lossless, preferably the decompressed current frame is used as the reference frame instead of the original uncompressed current frame, so that the encoder and the decoder are in sync. The process then continues, looping back to step S5, where the new reference frame is segmented and another frame is received, to become the now current frame. In some embodiments, the subsequent frame uses a frame other than the immediately prior current frame as its reference frame. In some embodiments, more than one prior encoded frame is used as the reference.

If the next frame is to be a key frame, the process loops back to step S1 and repeats from there, with the next frame being the current frame. The process can loop until there are no more frames to encode. It should be understood that the encoder might also perform steps such as adding header information, such as at the beginning of a sequence or the end of a sequence.

Figure 9:
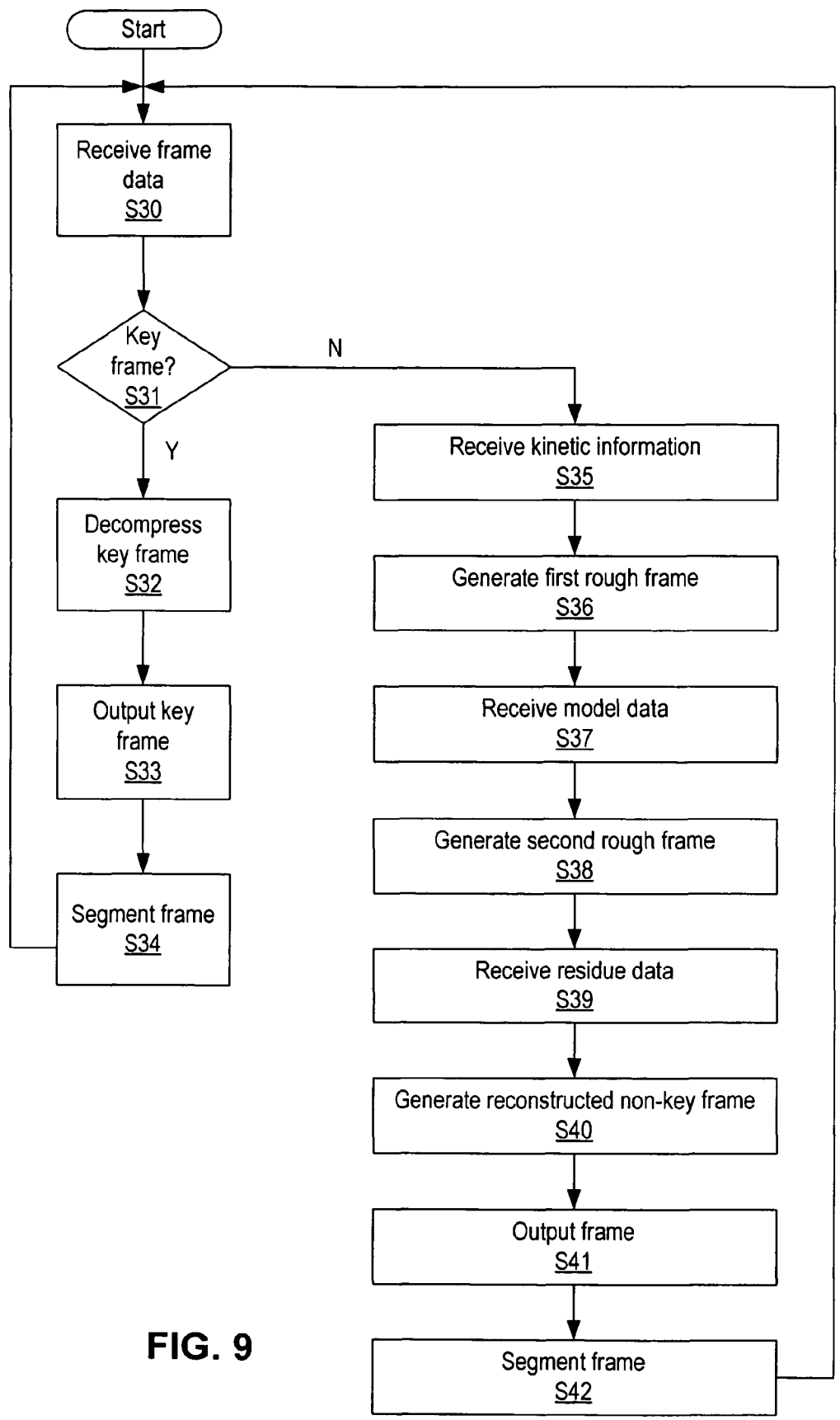
FIG. 9 is a flowchart of a decoding process.

Referring now to FIG. 9, a flowchart of a decoding process is there shown. The process begins with receiving a compressed frame (step S30). The decoder then determines if the received frame is a key frame (S31), such as by inspecting a "keyframe" flag in the input data. Alternatively, the decoder can guess from the prior decoded data using rules known the encoder.

If it is a key frame, it is decompressed (S32), output (S33) and stored as a reference frame. If the decoder can determine that the current frame will not be used as a reference frame, then it need not be stored as the reference frame. In some implementations, the frame does not have to be stored and its current location is just labelled as the location of the reference frame. In other implementations, the frame is moved into storage specifically for reference frames. The process then loops back to step S30 awaiting another frame.

If the received frame is not a key frame, the decoder receives kinetic information (S35). If the encoded stream includes them, the decoder receive an indication of which of a plurality of segmentations was used by encoder, segmentation hints, partial segmentation information, canonical information or the like. From the received information, a first rough frame is generated (S36). One way to generated the first rough frame is to start with a blank frame and populate it with pixel values from segments of the reference frame, adjusting the segments as indicated by the kinetic information and other received information.

Next, the model data is received (S37) and a second rough frame is generated (S38) by modifying the first rough frame according to the model data. Alternatively, the model data might have been received before step S36. The decoder might combine the steps of generating the first and second rough frames into one step of frame generation. The model data, if used, might include results of exposed area processing, general image parameterization or application of non-motion related kinetic information.

Next, the compressed residue frame is received (S39) and a reconstructed nonkey frame is generated (S40) by modifying the second rough frame according to the residue data. As with the above steps, the ordering of the receipt and generation might be different than this example describes.

Once the nonkey frame is generated, it can be output (S41). If that frame is to be used as a reference frame for other nonkey frames, it is stored as the reference frame and segmented (S42) and the process loops back to step S30 to receive the next frame until all the frames are received.

Specific Implementations

The examples described above can be further particularized depending on needs of the application or known characteristics of the images. This section describes various optional implementation details that might be used to improve upon the above-described systems for particular needs or purposes.

Partial Synchronization

In the examples above, it is generally assumed that the encoder and the decoder are in sync. For example, where the encoder needs to make a coding decision, the encoder bases the decision on the version of the video sequence that the decoder has, not what the encoder has, if those two differ. In a partial synchronization system, the encoder might sometimes use information that is not available to the decoder and the decoder would make a best guess. This is most useful where the effects of a wrong guess at the decoder are not expected to be significant and there are great gains to be made in computing effort or compression ratios if complete synchronization is not enforced.

Hints

Where the encoder determines that the errors between an original frame and the decompressed version of the compressed original frame, due to the compression not being lossless, and that the errors would introduce undesirable artifacts, the encoder can include hints usable by the decoder to reduce those errors. In a simple example, the encoder losslessly encodes the error (which might require more bits overall than if the original frame were losslessly compressed). In a more likely example, the encoder might determine which of the differences cause significant segmentation differences and hint to correct for those segmentation differences. Such hints might allow the decoder to reconstruct (and thus use) a segmentation of the original frame rather than the reconstructed frame.

The hints might also be usable by the decoder to partially or fully synchronize the decoder to the encoder segmentation or to the encoder canonicalization.

Metadata

Other information included in the compressed video data might be metadata associated with segments. Since the segments are often associated with objects in a scene, the metadata could be used for point-and-click operations. For example, the video stream might include references to areas of the input frame that are associated with metadata. The encoder's segmenter can then associate that metadata with specific segments. Those associations can be provided to the decoder, for use by the video user. For example, areas of the image could be associated with URLs linking the area to a resource on the Internet. Those associations would be carried with the image as the video sequence is presented to the video user.

Metadata is associated with segments and can remain with segments from frame to frame as the segment evolves. For example, a segment's segment index may change due to changes in position or other canonicalization process, but the metadata will remain associated with that segment (i.e., inherited from prior frame's segments). Metadata can be associated with a group of segments and if a segment breaks up, the new multiple segments will all inherit the prior frame segment's metadata.

Hierarchy of Segmentation

Where a frame is an image of a scene containing objects larger than a pixel extent, the segmentation of the frame might tend to follow bounds of the objects. In the simplified example of FIG. 7, where the objects are a truck with windows and tires, and a sun and a road, the segmentation follows the bounds of the objects in the scene.

As might be apparent from FIG. 7, if the kinetic information for each segment is encoded separately, some redundancy will occur, as the displacements of the truck, the tires and the windows will typically be the same or very similar. Reducing this redundancy would result in a smaller compressed size for the compressed video data. One way to reduce this redundancy is to establish a hierarchy of segmentation.

Using FIG. 7 as an example, the truck, tires and windows might be grouped into one higher level segment comprising several (five, in this case) segments at a lower level in the segment hierarchy. When coding segment information such as translation, the high level segment translation could be given, along with relative translations of the lower level segments relative to the "group" translation. This might also apply to other kinetic information, such as lighting changes.

Segmentation can be either bottom-up or top-down. With bottom-up segmentation, an image is segmented based on image content into first-level segments (small segments) and those first-level segments are grouped into second-level segments based on first-level segment content (i.e., pixel color values of pixels in the first-level segments, relative motion, etc.). The process is then continued to find third-level segments up to N-level segments, if more than two levels of the hierarchy are used.

With top-down segmentation, an image is segmented based on image content into first-level segments (large segments) and those first-level segments are segmented into one or more second-level segments based on first-level segment content and the process is then continued to find third-level segments down to N-level segments, if more than two levels of the hierarchy are used.

For a bottom-up segment hierarchy, the generation of second-level segments might consider the boundaries of the first-level segments as well as pixel values in the first-level segments.

A degenerate hierarchy (i.e., a one-level hierarchy) might result from either of these hierarchy approaches. Preferably, the segments that are grouped into a group of segments are "simply connected" together.

An encoder can send the segment hierarchy to a decoder for use in decoding the frame, but in some embodiments, the encoder and decoder are in sync, so the decoder can generate a segment hierarchy from already decoded frames for use in decoding a current frame.

The segment hierarchy might be useful in editing or formatting one or more frames, wherein edits or formats are applied at varying levels of groupings of segments. The segment hierarchy is likely to be useful for compressing the video data and/or associating metadata with elements of the frame, since the hierarchy of the segments might follow the hierarchy of objects in the scene. For example, for a scene of a football game, higher-level segments might envelop a player and a football, while lower-level segments envelop various areas of the player's jersey and helmet, the laces of the football, etc.

Motion Vector Grouping/Kinetic Data Elements Grouping

Instead of sending encoding each motion vector and each other kinetic data element separately, motion vectors (for example) might be grouped in various levels of hierarchy. The groupings can be done as described herein for segment groupings, or the motion vectors can be grouped independently of any segment grouping.

When a set of motion vectors is encoded as a group, the encoding includes a group motion vector and residual motion vectors indicating changes of each member relative to their group motion vector. This can also be done for other kinetic data elements, such as lighting changes.

The grouping of a current set of motion vectors can be done by looking at a prior set of motion vectors and/or by looking at the content of the reference image, such as its segmentation. The reference image is the image to which the motion vectors relate, such that the motion vectors represent kinetic differences between the reference image and the current image.

In some embodiments, the ordering of segments and the encoder and decoder need not be consistent and the grouping is done by considering the values for the prior set of motion vectors or the segments of the reference image and group based on their values instead of any index. The indication of the grouping by value can also be partial, where the encoder conveys part of the grouping and the decoder determines the rest.

In some embodiments, there is a distinction between the case where there is no prior history and where there is prior history. In the former case, the encoder encodes and the decoder decodes using groupings of motion vectors that are determinable from the contents or segments of the reference frame, while in the latter case the encoder can encode and the decoder can decode using groupings of motion vectors that are based on previously occurring motion vectors and/or previous groupings of motion vectors.

The reference frame can be a key frame or a previously coded/decoded nonkey frame. In a video sequence, the current frame need not occur before or after the reference frame. The decoder assumes the motion vector data comes in groups and the decoder knows the hierarchy of segments. Thus, the encoded stream can be first level resolution of motion vectors, followed by residues as the next level, etc.

Synchronous Temporal Predicting of Motion Vectors at Encoder and Decoder

If the motion vectors (and other kinetic information) are encoded without reference to predictable changes, further compression might be possible by omitting predictable changes, e.g., by only encoding the difference between a predicted change and an actual change. For example, if a segment is moving from frame to frame in a linear direction, a prediction would be that the motion vector for subsequent frames would indicate continued movement in that linear direction. Thus, where the encoder and the decoder are both performing the prediction, the encoder need only encode any variance from that linear motion as opposed to encoding the entire motion. The prediction can use a hierarchy of segments and/or a hierarchy of motion vectors, possibly resulting in a hierarchy of predictions.

One type of prediction is to examine the motion of segments in a first frame and a second frame and predict that inertia will apply to movements of the segments in a third frame. Another type of prediction is that if the light is fading linearly (or in a nonlinear, but predictable way), the kinetic information about lighting is predicted.

In one variation, motion vectors are grouped and the group motion vectors are predicted while the residual relative motion vectors or each member of the group are encoded as the difference between the predicted group motion and the actual individual member motion, regardless of what the actual group motion is, thus encoding the correction to the prediction and the refinement of individual member movement.

Exposed Area Filling Performed by Encoder and Decoder

Where motion vector coding is used to encode a nonkey frame, exposed areas might be present in the resulting intermediate construction of the nonkey frame following application of motion vectors and other kinetic information. The intermediate construction, or "rough" frame" is the frame generated, or generatable, from just a reference frame and a set of motion vectors describing the position changes of blocks or segments between the reference frame and the "current" frame being encoded or decoded. If all of the segments in the reference frame find matches in the current frame and none of the segments moved, then of course there would be no gaps in the content of the current frame. However, if there is motion at all from frame to frame, there are likely to be areas of the current frame that are "exposed" areas. Without more understanding of the objects in the scene being captured by the images formed by the frames being encoded, the pixel color values for pixels in exposed areas of the current frame cannot be deduced from the reference frame, because whatever object or object portion that is represented by the exposed area was not present in the reference frame.

With understanding of the objects in the scene, however, the encoder and decoder can infer what the newly exposed area looks like. For example, if it is apparent that the scene is a round ball passing over a checkerboard pattern, the encoder can infer that any areas that were obscured by the ball in the reference frame but are exposed in the current frame can be described by a continuation of the checkerboard pattern. This information can be used by the decoder to decode exposed areas without information from the encoder and the encoder can use this information to determine what to omit from the encoded video data stream. In some cases, such as were the encoder estimates what the exposed area looks like and the estimate matches what is actually there in the current frame, the encoded video data need not include any further information about the exposed area and the decoder will still correctly construct the exposed area in the current frame.

The exposed area filling process described herein can be used in a segment-based system where the current frame is roughly encoded by reference to segments of a reference frame and motion vectors associated with those reference frame segments, but can also be used in a block-based system where the current frame is roughly encoded by reference to blocks of a reference frame and motion vectors associated with those reference frame blocks. One difference between a segment-based system and a block-based system is the a segment-based system uses frames divided up based on frame pixel color values, whereas a block-based system typically divides up a frame in a fixed manner regardless of content, such as dividing up each frame into 8 pixel by 8 pixel macroblocks.

Typically, in a block-based system, the blocks are matched and motion vectors generated and the leftover areas of the current frame (the exposed areas) are encoded as part of the residue. This can be inefficient, if the residue contains bits of information that the decoder can infer by itself from what information the decoder already has.

In a typical segment-based process, a key frame is received, compressed and used as a reference frame. If the compression is not lossless, the compressed frame is decompressed and used instead of the original. The frame is then segmented.

When a nonkey frame is received, it is processed with reference to the segmentation and content of the reference frame. Thus, segments are matched between the segmentation of the reference frame and the content of the current frame. The kinetic information describing changes in the segments from frame to frame is then generated. From this, a first approximation to the nonkey frame is generated or exists.

The pixels of the current frame that are not associated with segments from the reference frame are considered exposed areas. These exposed area pixels can be assigned to new segments, as appropriate. Each of the new segments is then processed to determine how to code the pixels from the current frame that fall into these new segments. Examples are described below.

For decoding, the decoder can generate the first approximation from the reference frame and the motion vectors. It then applies the encoding of the exposed areas, as provided by the encoder, to fill in the rest of the frame. In some cases, the exposed area filling information leaves nothing to be included as residue, but in other cases, the result of applying the exposed area filling is a second approximation of the current frame that is then processed according to the residue data.

One method of exposed area filling examines the pixel color values of adjacent segments and continues the color values or patterns of adjacent segments with higher z-order values than other adjacent segments. This would be an accurate reconstruction of an exposed area where one object in the scene is partially obscuring another object in the scene. The obscured object would have a higher z-order, because it is further from the point of view of the frame and thus it would be a good estimate to assume that when the closer object moves to expose an exposed area, the exposed area is actually part of the obscured object. If that doesn't happen to be the case, then the difference can be coded as exposed area filling, or it can be ignored and be included as part of the residue.

Note that the encoder and decoder can both perform the exposed area filling process, so that the encoder does not need to encode the results of the process, other than the variance between the current frame and the results of the process. In cases where one of a plurality of fill schemes is used, the encoder can encode its selection, unless the decoder can infer correctly the scheme used.

Exposed area fill information might include bounds of areas to be filled, and/or pixel values of pixels in areas to be filled. Partial fill information or fill hints might be included in the encoded video data and the exposed area filling process need not be exact, if differences in the filling done by the decoder and encoder are acceptable. In some implementations, the exposed area filling is done entirely at the encoder and conveyed to decoder, in which case, decoder processing is not required.

Residue Coding Performed Using Basis Functions by Encoder and Decoder

In some of the examples described above, after various coding steps are performed, the remaining residue between the current frame and what has been coded is then just coded as a difference frame using conventional methods. For example, since it is expected that most residue frames would be sparsely populated, it can be quickly compressed using run-length encoding. However, in some cases, compression of the residue frame can be improved by coding the residue using basis functions. Thus, the encoded residue would comprise coefficients of basis functions known to the encoder and the decoder. Basis function encoding of a residue frame could be done where the residue is left over after a segment-based coding, or left over after other types of coding.

What is claimed is:

1. An encoding apparatus for encoding uncompressed video data to form compressed video data which is decodable to form at least an approximation of the uncompressed video data, wherein the video data comprises a plurality of image frames comprising key frames and nonkey frames, wherein a nonkey frame is a frame that is encoded with reference to segmentation of other frames (reference frames), and wherein a segmentation of a reference frame is an assignment of some or all of the pixels of the reference frame to segments based on at least one of pixel color values of the pixels and location of the pixels in the reference frame, the apparatus comprising:
   a) a segmenter that generates a segmentation of a reference frame;
   b) a motion matcher that matches a segment of the reference frame to an area of a current frame being encoded when the current frame is a nonkey frame;
   c) a metadata associator that creates a metadata element associated with the segment of the reference frame and further associated with the matched area of the current frame, wherein the metadata element is inherited, such that when a segment associated with the matched area in the current frame is broken up into a group of segments in a subsequent frame, the segments in the group all inherit the metadata element; and
   d) compressed video data outputter that outputs compressed video data including at least compressed key frames, the kinetic information and the metadata element.

2. The encoding apparatus of claim 1, wherein the metadata associator receives indications of an area of the reference frame to which the metadata element is associated and associates the metadata element to the segment of the reference frame that includes the indicated areas of the reference frame.

3. The encoding apparatus of claim 1, wherein the metadata element is associated with a representation an object within a plurality of image frames.

4. The encoding apparatus of claim 1, wherein the metadata element specifies a response to an input indicating a selection of the area of a current frame associated with the metadata element.

5. The encoding apparatus of claim 1, wherein the metadata element includes a Uniform Resource Locator associating data with the area of a current frame associated with the metadata element.

6. The encoding apparatus of claim 1, wherein the metadata element of a current frame is included in the compressed video data for the current frame.

7. The encoding apparatus of claim 1, wherein the segmenter further generates information about how the segments are ordered, and the compressed video data outputter includes the segment ordering information in the kinetic information of the compressed video data.

8. The encoding apparatus of claim 1, wherein the segmenter further generates a segmentation hint so as to allow a decoder to reconstruct a segmentation of an original version of the reference frame rather than a segmentation of a reconstructed version of the reference frame.

9. The encoding apparatus of claim 1, wherein the metadata element is further inheritable from the association with the segment of the first frame to an association with a plurality of segments of the second frame, when the decoder matches the segment of the first frame to the plurality of segments in the second frame, wherein such inheritance is independent of segment indices.

10. An encoding apparatus for encoding uncompressed video data to form compressed video data which is decodable to form at least an approximation of the uncompressed video data, wherein the video data comprises a sequence of a plurality of image frames that can be segmented where a segmentation of a frame is an assignment of some or all of the pixels of the frame to segments based on at least one of pixel color values of the pixels and location of the pixels in the frame, the encoding apparatus comprising:
   a) a segmenter that generates a segmentation of a frame and further generates a segmentation hint which is used by a decoder so as to allow the decoder to reconstruct a segmentation of an original version of the frame rather than a segmentation of a reconstructed version of the frame;
   b) a metadata associator that associates metadata elements with segments of the segmentation of the frame; and
   c) compressed video data outputter that outputs compressed video data including the metadata.

11. A method for encoding uncompressed video data to form compressed video data which is decodable to form at least an approximation of the uncompressed video data, wherein the video data comprises a plurality of image frames comprising key frames and nonkey frames, wherein a nonkey frame is a frame that is encoded with reference to segmentation of other frames (reference frames), and wherein the segmentation of a reference frame is an assignment of some or all of the pixels of the reference frame to segments based on at least one of pixel color values of the pixels and location of the pixels in the reference frame, the method comprising:
   a) generating a segmentation of a reference frame;
   b) matching a segment of the reference frame to an area of a current frame being encoded when the current frame is a nonkey frame;
   c) creating a metadata element associated with the segment of the reference frame and further associated with the matched area of the current frame, wherein the metadata element specifies a response to an input indicating a user selection of the area of the current frame associated with the metadata element; and d) outputting compressed video data including at least compressed key frames, the kinetic information and the metadata element.

12. The method of claim 11, further comprising receiving indications of an area of the reference frame to which the metadata element is associated, and associating the metadata element to the segment of the reference frame that includes the indicated areas of the reference frame.

13. The method of claim 11, wherein the metadata element is associated with a representation an object within a plurality of image frames.

14. The method of claim 11, wherein the metadata element includes a Uniform Resource Locator associating data with the area of a current frame associated with the metadata element, and wherein the response to said input comprises retrieving a resource associated with the Uniform Resource Locator.

15. A method of encoding uncompressed video data to form compressed video data which is decodable to form at least an approximation of the uncompressed video data, wherein the video data comprises a plurality of image frames that are segmented, wherein a segmentation of a frame is an assignment of some or all of the pixels of the frame to segments based on at least one of pixel color values of the pixels and location of the pixels in the frame, the method comprising:

a) generating a segmentation of a frame;

b) associating metadata elements with segments of the segmentation of the frame, wherein the metadata element is inherited, such that when a segment associated with the matched area in the current frame is broken up into a group of segments in a subsequent frame, the segments in the group all inherit the metadata element; and c) outputting compressed video data including the metadata.

16. An apparatus for decoding compressed video data to form at least an approximation of uncompressed video data, wherein the video data comprises a sequence of a plurality of segmented image frames, wherein a segmentation of a frame is an assignment of some or all of the pixels of the frame to segments based on at least one of pixel color values of the pixels and location of the pixels in the frame, the apparatus comprising:

an input scheduler configured to receive the compressed video data, wherein the compressed video data includes segment-specific metadata, wherein the segment-specific metadata element specifies a response to an input indicating a user selection of an area of the frame associated with the metadata element;

a frame decompressor for receiving and decoding key frames received from the input scheduler;

a frame buffer for storing decoded frames;

a segmenter configured to segment the decoded frames from the frame buffer to generate a segment data set;

data storage configured to receive and store kinetic information, residues and segment-specific metadata for nonkey frames from the input scheduler; and a frame reconstructor for reconstructing a rough version of a current frame using the segment data and kinetic information for the current frame; and a processor for regenerating the current frame using the rough current frame and residue information for the current frame.

17. The apparatus of claim 16, wherein the segment-specific metadata includes a Uniform Resource Locator associating data with an area of the current frame associated with the metadata element, and wherein the response to said input comprises retrieving a resource associated with the Uniform Resource Locator.

* * * * *